(12) United States Patent
Heim

(10) Patent No.: US 8,074,514 B1
(45) Date of Patent: Dec. 13, 2011

(54) LIQUID LEVEL SENSOR WITH CONDUCTIVE TORSION SPRINGS

(75) Inventor: Richard William Heim, Shawnee, KS (US)

(73) Assignee: Richard W. Heim, Shawnee, KS (US)

( * ) Notice: Subject to any disclaimer, the term of this patent is extended or adjusted under 35 U.S.C. 154(b) by 360 days.

(21) Appl. No.: 12/471,385

(22) Filed: May 24, 2009

(51) Int. Cl.
  *G01F 23/00* (2006.01)
(52) U.S. Cl. ................................... 73/304 R
(58) Field of Classification Search ..... 73/290 R–290 B, 73/304 R, 866.5, 432.1; 340/620
  See application file for complete search history.

(56) References Cited

U.S. PATENT DOCUMENTS

| | | | |
|---|---|---|---|
| 4,949,627 A | 8/1990 | Nordskog | |
| 6,047,630 A | 4/2000 | Brown | |
| 6,050,175 A | 4/2000 | Mirand | |
| 6,227,101 B1 | 5/2001 | Rabadi | |
| 6,779,435 B1 | 8/2004 | Iacobucci | |
| 7,017,408 B2 | 3/2006 | Ramus | |
| 7,210,400 B2 | 5/2007 | Kaminishi | |
| 2011/0011177 A1* | 1/2011 | Hannah et al. | 73/290 R |

FOREIGN PATENT DOCUMENTS

WO  WO 2008154698 A1 * 12/2008

* cited by examiner

*Primary Examiner* — Hezron E Williams
*Assistant Examiner* — Jamar Ray

(57) ABSTRACT

An assembly with liquid level sensor probes which rotate down into a container by means of torsion springs, thereby eliminating failure to the springs due to bending. The torsion springs also act as conductors in an electric circuit without any electrical slip joints or rotating electrical contact joints which can become contaminated or oxidized and thereby interrupt electric continuity of the circuit.

2 Claims, 4 Drawing Sheets

LIQUID LEVEL SENSOR WITH CONDUCTIVE TORSION SPRINGS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

Figure 1:
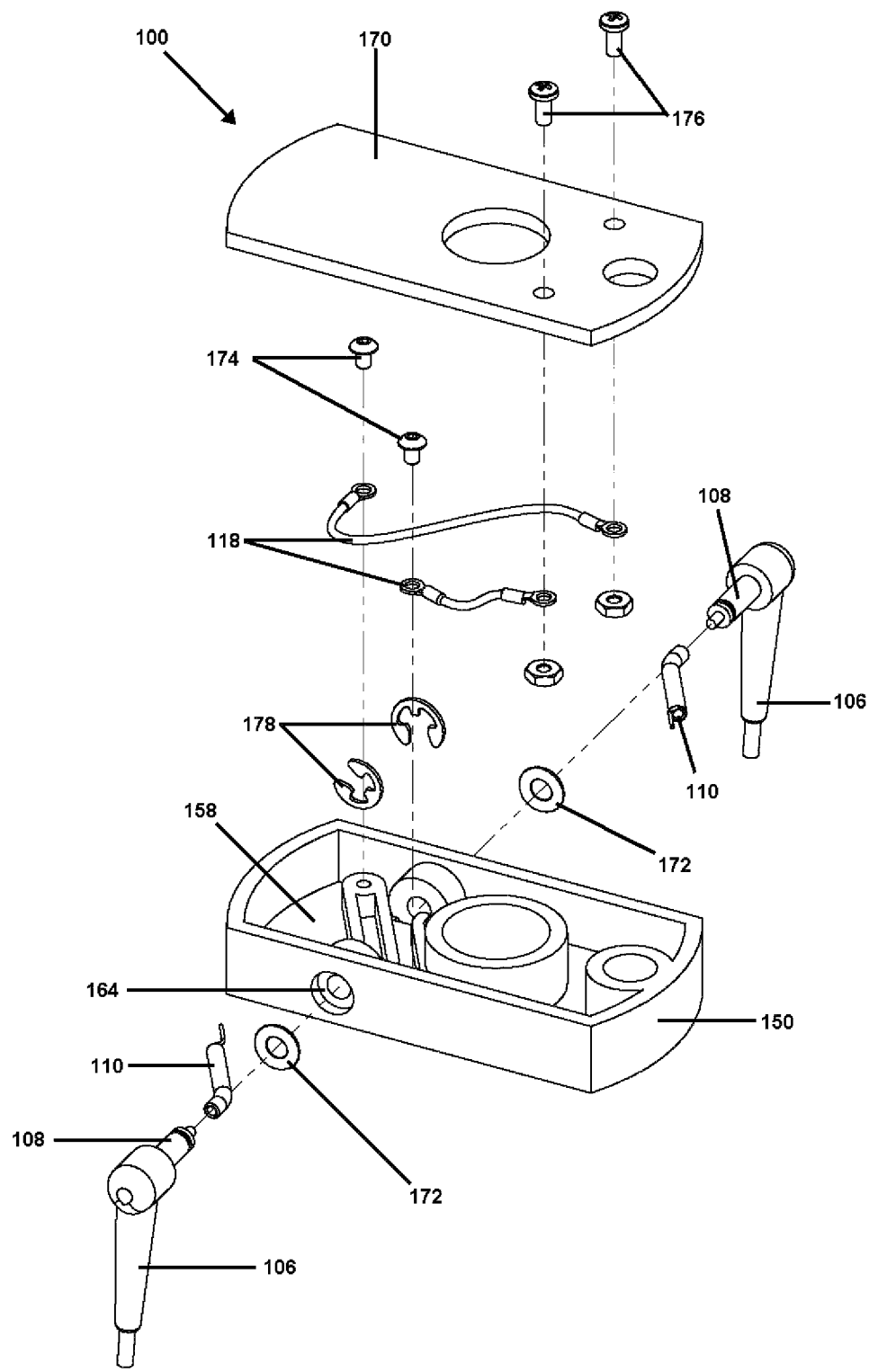

This invention relates to sensing the liquid level in a container as used in a beverage brewing device or hot water container in an aircraft.

2. Prior Art

Coffee makers on aircraft are used many times per month and therefore must be very reliable. The current art, U.S. Pat. No. 4,949,627, uses "swingably" mounted electrodes to detect when the coffee maker server is full and to therefore stop filling the server. These electrodes are conductive metal segments linked together by conductive pins, bolts, and nuts. The problem with this design is the fact that over time coffee residue and oxidation builds up between the links and between the pins and links. This residue and oxidation reduces the electrical conductivity of the electrode linkage, and thus renders the electrode sensor inoperable and causing the server to overflow.

One conventional technique for solving the problem of residue interrupting electrical conductivity in electrodes is to use a probe without links. Instead of "swingably" mounted electrodes, probes mounted with springs are used. This provides an electrode without gaps to become contaminated. These probes are always oriented downward into the server. When the server is put into the coffee maker the probes are pushed out of the way by the server and then flex back into position inside the server. The probes are attached to the springs with the axis of the probes aligned with the axis of the spring coils causing the springs to flex perpendicular to the axis of the spring.

Repeated bending and overstressing of the springs causes failure of the springs and the probes to sever and detach. The current art, U.S. Pat. No. 7,017,408, attempted to eliminate the mechanical failures associated with spring mounted probes by replacing conductive probes with infrared light emitting diodes (IRED) to detect the liquid level in the server. The IRED concept has problems with the lenses becoming dirty from steam and coffee residue which cause the IRED concept to not detect the liquid surface and therefore overfilling occurs. The IRED also has difficulty detecting the liquid surface when the surface is rippled due to aircraft vibration. The IRED concept also has errors detecting the maximum allowed surface level when the aircraft is not in level flight since the liquid surface is not horizontal. Problems also occur with the IRED concept in detecting the liquid surface due to the density of steam. All of these problems cause the IRED concept to overflow the server.

SUMMARY

In accordance with one embodiment, torsion springs attached to sealed shafts rotate the probe to a downward position. The level sensor probes pivot about a sealed shaft when a server or other container pushes on the end of the probes. The torsion springs attached to the sealed shaft allow the shaft to rotate the probes to an upward position. The torsion springs are not overstressed, do not bend and therefore do not sever and detach. The torsion springs are electrically conductive, as are the shafts and probes. The connection between the shafts and torsion springs is a solid conductive connection.

DRAWINGS

Figures

Figure 2:
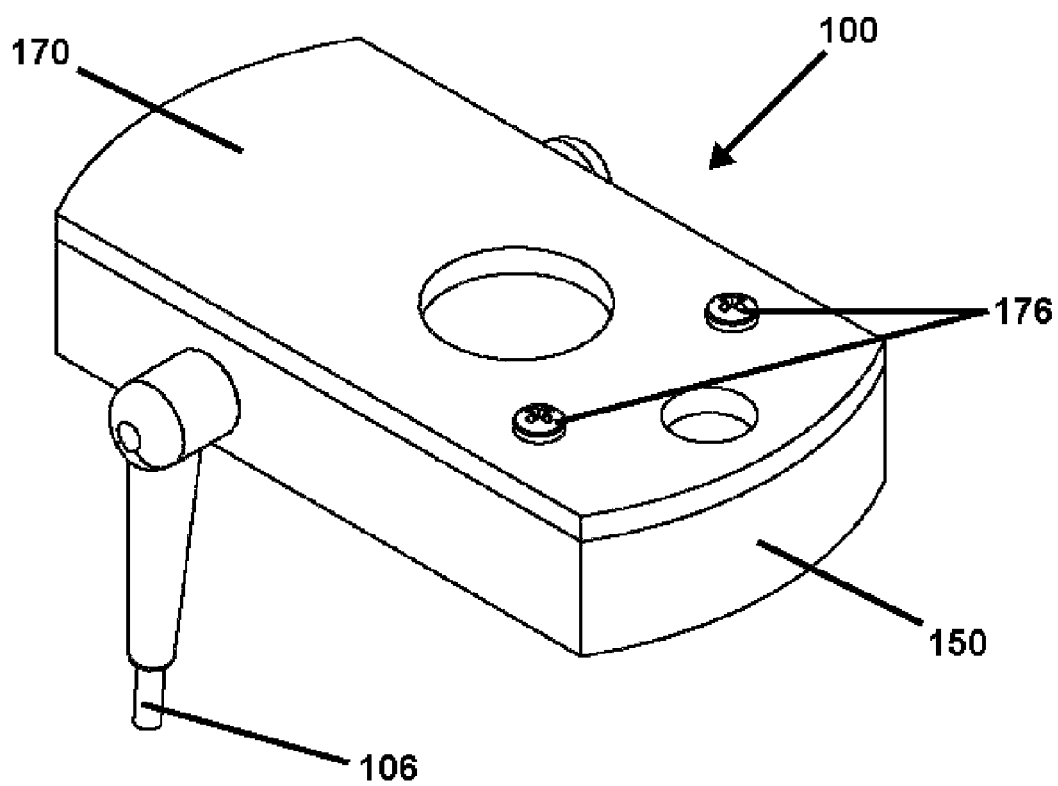
Figure 3:
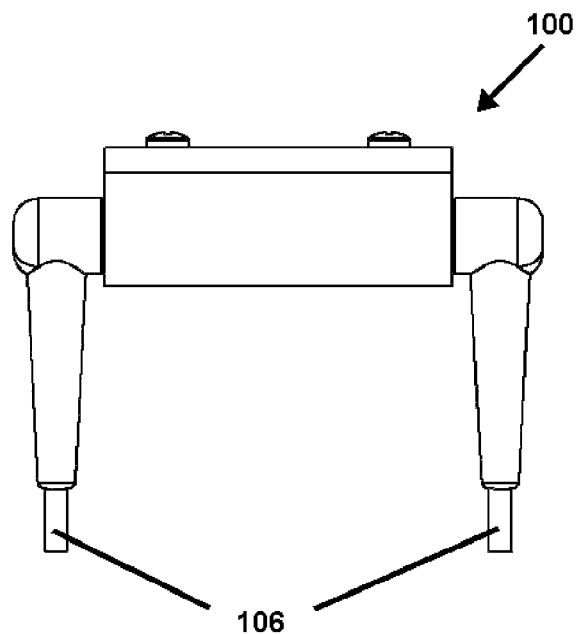
Figure 4:
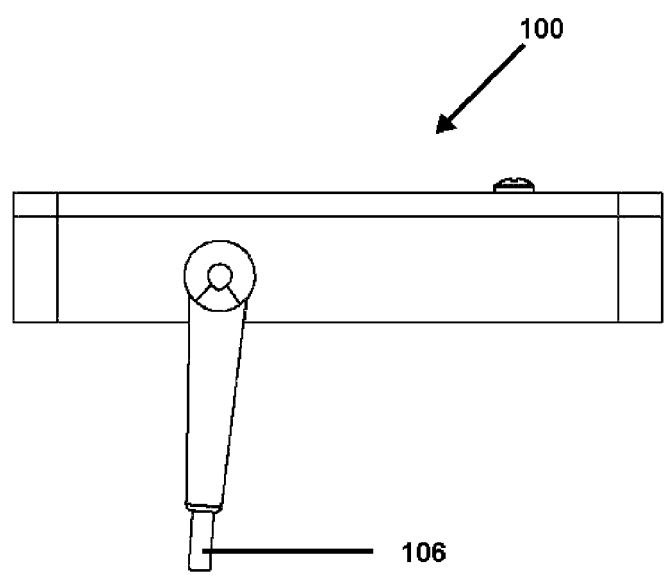
Figure 5:
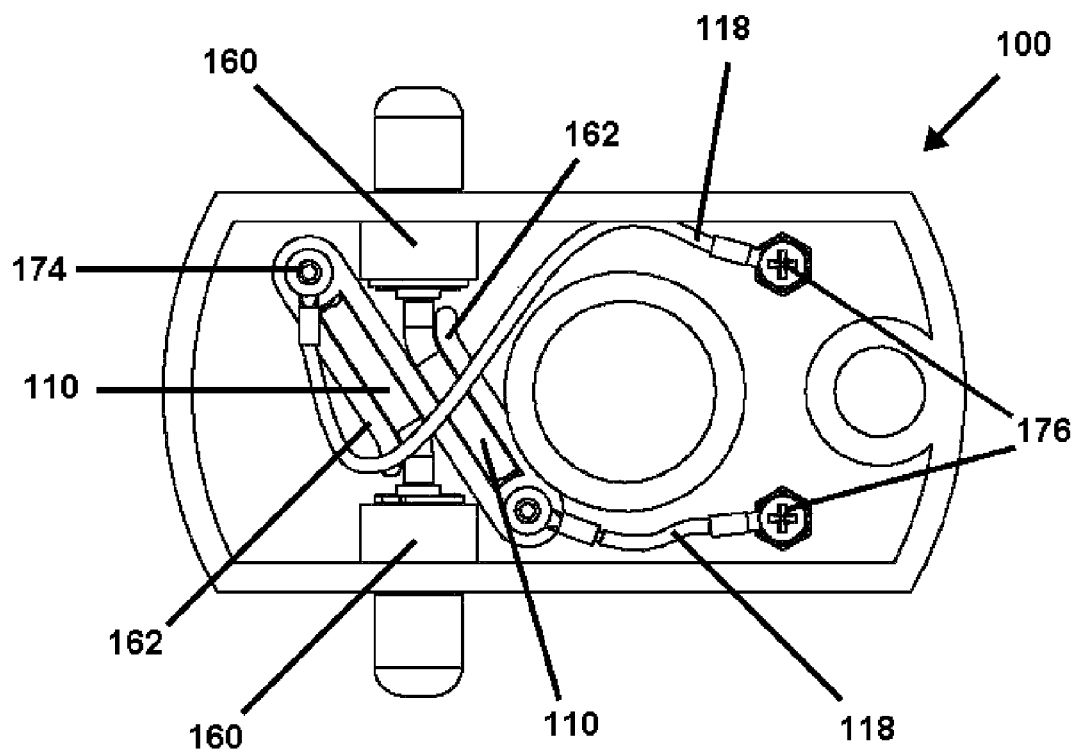

FIG. 1 shows an exploded view of the assembly
FIG. 2 shows an isometric view of the assembly
FIG. 3 shows a front view of the assembly
FIG. 4 shows a side view of the assembly
FIG. 5 shows a top view of the assembly with the cover removed

DRAWINGS

Reference Numerals

100 sensor probe assembly
106 probes
108 sealed shaft
110 torsion spring
118 sensor probe wire
150 housing
158 sealed cavity
160 sealed rotation joint
162 spring channel
164 holes in sealed cavity
170 cover
172 seal
174 screw
176 screw
178 retainer

DETAILED DESCRIPTION

The present invention provides for an apparatus with a reliable sensor probe assembly to detect the surface of a liquid in a container with an upper opening, such as a server for a beverage maker or a hot water container in an aircraft.

One embodiment of a reliable sensor probe assembly is illustrated in FIGS. 1-5. The sensor probe assembly 100 comprises a housing 150, has two electrically conductive probes 106 connected via sealed rotation joints 160 with electrically conductive sealed shafts 108. Housing 150 has a cover 170 and a sealed cavity 158 containing two torsion springs 110. Torsion springs 110 are held in place inside sealed cavity 158 by spring channels 162. One end of torsion springs 110 are fixed by screw 174 and connected electrically to sensor probe wires 118 as shown in FIG. 5. The other end of sensor probe wires 118 are secured with screws 176 to cover 170. Sealed shafts 108 are inserted through holes 164 in the sealed cavity 158 and secured with retainers 178 in such manner as to retain the sealed shafts 108 and allow the sealed shafts 108 to rotate in the sealed rotation joints 160. Seals 172 are shown in FIG. 1. The ends of sealed shafts 108 inserted into sealed cavity 158 are connected to the ends of torsion springs 110 that are not fixed. The connections between torsion springs 110 and sealed shafts 108 are electrically conductive. There is electrical continuity from probes 106 to sealed shafts 108 to torsion springs 110 to sensor probe wires 118 with all connections being solid, that is without any electrical slip joints or rotating electrical contact joints which could become contaminated and build up electrical resistance.

Operation

A container is placed in a coffee maker or hot water system pushing probes 106 out of the way. This causes the probes 106 to rotate about sealed shafts 108 to an upward position. Sealed shafts 108 are connected to torsion springs 110. The rotation of sealed shafts 108 cause torsion springs 110 to be put into torsion. Once probes 106 pass the edge of the container, torsion springs 110 cause probes 106 to rotate back to the downward position inside the container. When the container is filled with liquid to a predetermined level, the liquid makes contact with probes 106 completing an electric circuit through an electronic controller via the conductive sealed shafts 108, torsion springs 110 and sensor probe wires 118 signaling the controller to close a solenoid valve that is filling the container.

Advantages

From the description above, a number of advantages of some embodiments of my sensor probe assembly become evident:

(a) Reliability of a beverage brewing device or hot water container will be increased due to the use of torsion springs that are not forced to bend, thereby eliminating failure due to overstressing of the springs.

(b) Eliminating the IRED level sensors which are prone to error detecting the fluid level surface.

(c) Eliminating overflow due to metal linkage type probes becoming contaminated or oxidized and losing electrical continuity between links.

(d) Eliminating the need for rotating electrical contact joints which can lose electrical continuity.

(e) Eliminating the need for brushes or fingers to make electrical contact which can become deformed or contaminated, thereby losing electrical continuity.

CONCLUSIONS, RAMIFICATIONS, AND SCOPE

The reader will see that, according to one embodiment of the present invention, I have provided a sensor probe assembly that improves the reliability of a beverage brewing device or hot water container. This reliability improvement is due to the probes being connected to torsion springs that are not forced to bend, thereby eliminating failure due to overstressing the springs. Reliability is also improved by not having to rely on IRED sensors that are prone to error in detecting a liquid surface. While the above description contains many specificities, these should not be construed as limitations on the scope of any embodiment, but as exemplifications of the presently preferred embodiments thereof. Many other variations are possible within the teachings of the various embodiments. Thus the scope of the invention should be determined by the appended claims and their legal equivalents, and not by the examples given.

I claim:

1. An apparatus for detecting the liquid level in a container having an upper opening, that apparatus comprising:
   (a) a housing,
   (b) a plurality of electrically conductive probes, each said probe being attached to said housing by electrically conductive sealed shafts and sealed rotation joints, and
   (c) a plurality of electrically conductive torsion springs contained in a sealed cavity with one end of said torsion springs being attached to said housing and the other end of said torsion springs being attached to said sealed shafts,
   whereby said torsion springs cause said probes to rotate about said sealed shafts to a downward position.

2. An apparatus for detecting the liquid level in a container having an upper opening, that apparatus comprising:
   (a) a housing,
   (b) a plurality of electrically conductive probes, each said probe being attached to said housing by electrically conductive sealed shafts and sealed rotation joints,
   (c) a plurality of electrically conductive torsion springs contained in a sealed cavity with one end of said torsion springs being attached to said housing and the other end of said torsion springs being attached to said sealed shafts, and
   (d) a plurality of sensor probe wires connected to said torsion springs whereby there is electrical continuity from said probes to said sealed shafts to said torsion springs and to said sensor probe wires.

* * * * *